US012528212B2

(12) United States Patent
Schneider et al.

(10) Patent No.: US 12,528,212 B2
(45) Date of Patent: Jan. 20, 2026

(54) ELECTRIC GROOMING APPLIANCE INCLUDING MAGNETIC COUPLING SYSTEM

(71) Applicant: Spectrum Brands, Inc., Middleton, WI (US)

(72) Inventors: Paul Anthony Schneider, Madison, WI (US); Richard Kirk Maguire, Middleton, WI (US); Timin Musallam, Middleton, WI (US)

(73) Assignee: Spectrum Brands, Inc., Middleton, WI (US)

( * ) Notice: Subject to any disclaimer, the term of this patent is extended or adjusted under 35 U.S.C. 154(b) by 609 days.

(21) Appl. No.: 17/624,304

(22) PCT Filed: Jul. 1, 2020

(86) PCT No.: PCT/US2020/040416

§ 371 (c)(1),
(2) Date: Dec. 31, 2021

(87) PCT Pub. No.: WO2021/003213

PCT Pub. Date: Jan. 7, 2021

(65) Prior Publication Data

US 2022/0355496 A1 Nov. 10, 2022

Related U.S. Application Data

(60) Provisional application No. 62/869,428, filed on Jul. 1, 2019.

(51) Int. Cl.
*B26B 19/38* (2006.01)
*B26B 19/14* (2006.01)

(52) U.S. Cl.
CPC ............ *B26B 19/386* (2013.01); *B26B 19/14* (2013.01); *B26B 19/3813* (2013.01)

(58) Field of Classification Search
CPC ... B26B 19/14; B26B 19/386; B26B 19/3853; B26B 19/3813
(Continued)

(56) References Cited

U.S. PATENT DOCUMENTS 2,241,983 A 5/1941 Connolly
3,067,513 A 12/1962 Randol
(Continued)

FOREIGN PATENT DOCUMENTS

CN 1550298 A 12/2004
CN 2767085 Y 3/2006
(Continued)

OTHER PUBLICATIONS

US 5,815,924 A, 10/1998, Apprille, Jr. et al. (withdrawn)
(Continued)

*Primary Examiner* — Nhat Chieu Q Do
(74) *Attorney, Agent, or Firm* — Armstrong Teasdale LLP

(57) ABSTRACT

A handheld grooming appliance includes a housing defining a handle, a head, and an interior space. The handheld grooming appliance further includes a grooming device operatively connected to a motor and supported by the head of the housing. The handheld grooming appliance also includes a magnetic coupling system configured to releasably attach the grooming device to the housing. The magnetic coupling system includes at least one first magnet located on the grooming device and at least one second magnet located on the housing. The first magnet and the second magnet provide an attractive force to secure the grooming device to the housing during operation of the handheld grooming appliance. The magnetic coupling system is arranged to allow selective detachment of the groom-
(Continued)

ing device from the housing when a user applies a force greater than the attractive force between the first and second magnets.

15 Claims, 17 Drawing Sheets

(58) Field of Classification Search
USPC ........................................................ 30/264
See application file for complete search history.

(56) References Cited

U.S. PATENT DOCUMENTS

| | | | |
|---|---|---|---|
| 3,344,520 A | 10/1967 | Williams | |
| 3,634,935 A | 1/1972 | Battigalli | |
| 3,824,687 A | 7/1974 | Baumann | |
| 3,828,430 A | 8/1974 | Yamada et al. | |
| 3,844,033 A | 10/1974 | Yonkers | |
| 3,855,697 A | 12/1974 | Meyer et al. | |
| 3,913,225 A | 10/1975 | Tietjens et al. | |
| 3,997,969 A | 12/1976 | Czerner et al. | |
| 4,089,110 A | 5/1978 | Rasco | |
| 4,314,405 A | 2/1982 | Park | |
| 4,318,223 A | 3/1982 | Bergsma et al. | |
| 4,336,651 A | 6/1982 | Caro | |
| 4,475,285 A | 10/1984 | Hara et al. | |
| 4,549,352 A | 10/1985 | Ochiai et al. | |
| 4,698,908 A | 10/1987 | Bergsma et al. | |
| 4,709,475 A | 12/1987 | Phung | |
| 4,875,288 A | 10/1989 | Trotta et al. | |
| 5,007,168 A | 4/1991 | Messinger et al. | |
| 5,146,814 A | 9/1992 | Vasichek | |
| 5,537,749 A | 7/1996 | Cacioppo | |
| 5,625,950 A | 5/1997 | Sterk et al. | |
| 5,711,328 A | 1/1998 | Braun | |
| 5,784,790 A | 7/1998 | Carson, III et al. | |
| 5,787,586 A | 8/1998 | Apprille, Jr. et al. | |
| 5,813,293 A | 9/1998 | Apprille, Jr. et al. | |
| 5,822,869 A | 10/1998 | Metcalf et al. | |
| 5,855,071 A | 1/1999 | Apprille, Jr. et al. | |
| 5,890,296 A | 4/1999 | Metcalf et al. | |
| 5,918,369 A | 7/1999 | Apprille, Jr. et al. | |
| 5,956,851 A | 9/1999 | Apprille, Jr. et al. | |
| 5,983,502 A | 11/1999 | Geertsma et al. | |
| 6,026,577 A | 2/2000 | Ferraro | |
| 6,029,354 A | 2/2000 | Apprille, Jr. et al. | |
| 6,041,926 A | 3/2000 | Petricca et al. | |
| 6,052,903 A | 4/2000 | Metcalf et al. | |
| 6,085,426 A | 7/2000 | Metcalf et al. | |
| 6,112,414 A | 9/2000 | Andis et al. | |
| 6,145,416 A * | 11/2000 | Bonniot | B25B 23/0035 81/177.8 |
| 6,192,586 B1 | 2/2001 | Metcalf et al. | |
| 6,226,870 B1 | 5/2001 | Barish | |
| 6,237,232 B1 | 5/2001 | Petricca et al. | |
| 6,354,005 B1 | 3/2002 | Bosch | |
| 6,443,305 B1 | 9/2002 | Stanford et al. | |
| 6,530,150 B1 | 3/2003 | Barish | |
| 6,568,081 B2 | 5/2003 | Barish | |
| 6,739,053 B2 | 5/2004 | McCambridge et al. | |
| 6,823,590 B2 | 11/2004 | Uchiyama et al. | |
| 6,948,248 B2 | 9/2005 | Andis et al. | |
| 7,143,517 B2 | 12/2006 | Kappes et al. | |
| 7,152,323 B1 | 12/2006 | Lin | |
| 7,162,802 B2 | 1/2007 | Benardeau et al. | |
| 7,222,428 B2 | 5/2007 | Koike | |
| 7,361,232 B2 | 4/2008 | Chasen et al. | |
| 7,401,407 B2 | 7/2008 | Miyasaka | |
| 7,472,483 B2 | 1/2009 | Beugels | |
| 8,296,954 B2 | 10/2012 | Schneider et al. | |
| 8,381,406 B2 | 2/2013 | Miyazaki | |
| 8,533,960 B1 * | 9/2013 | Barish | B26B 19/14 30/43.6 |
| 8,789,282 B2 | 7/2014 | Wilson et al. | |
| 9,009,978 B2 | 4/2015 | Schneider et al. | |
| 9,537,441 B2 | 1/2017 | Ibuki et al. | |
| 10,016,903 B2 | 7/2018 | McCambridge et al. | |
| 10,272,579 B2 | 4/2019 | Wilson et al. | |
| 10,350,774 B2 | 7/2019 | Wilson et al. | |
| 10,478,981 B2 | 11/2019 | Krauss et al. | |
| 10,500,743 B2 | 12/2019 | Krauss et al. | |
| 10,639,807 B2 | 5/2020 | Wilson et al. | |
| 2001/0027608 A1 | 10/2001 | Barish | |
| 2003/0101589 A1 | 6/2003 | Barish | |
| 2005/0005453 A1 | 1/2005 | Egeresi | |
| 2005/0262696 A1 | 12/2005 | Ouchi et al. | |
| 2006/0122631 A1 | 6/2006 | Kertz | |
| 2006/0156550 A1 | 7/2006 | Beugels et al. | |
| 2006/0179657 A1 | 8/2006 | Van Der Linden et al. | |
| 2009/0217531 A1 | 9/2009 | Muraguchi | |
| 2010/0275446 A1 | 11/2010 | Schmitt et al. | |
| 2011/0067241 A1 | 3/2011 | Ogawa et al. | |
| 2011/0088269 A1 | 4/2011 | Walker, Jr. et al. | |
| 2012/0151698 A1 * | 6/2012 | Schaefer | A61C 17/222 15/28 |
| 2013/0145624 A1 | 6/2013 | Jessemey et al. | |
| 2014/0041233 A1 | 2/2014 | Lau | |
| 2014/0116211 A1 | 5/2014 | Griffin et al. | |
| 2014/0196292 A1 * | 7/2014 | Schmitt | B26B 19/146 30/47 |
| 2015/0174775 A1 | 6/2015 | Hodgson | |
| 2015/0174776 A1 | 6/2015 | Hawes | |
| 2015/0251325 A1 | 9/2015 | Teteak et al. | |
| 2016/0082608 A1 | 3/2016 | Li | |
| 2016/0107324 A1 | 4/2016 | Robertson et al. | |
| 2016/0263758 A1 | 9/2016 | Wilson et al. | |
| 2017/0368699 A1 | 12/2017 | Schuebel et al. | |
| 2018/0147738 A1 | 5/2018 | Godlieb | |
| 2018/0178400 A1 | 6/2018 | Smal et al. | |
| 2019/0307222 A1 | 10/2019 | Hug | |
| 2019/0337171 A1 | 11/2019 | Lap et al. | |
| 2020/0223082 A1 | 7/2020 | Robertson et al. | |
| 2020/0246991 A1 | 8/2020 | Wilson et al. | |

FOREIGN PATENT DOCUMENTS

| | | | |
|---|---|---|---|
| CN | 100406212 C | 7/2008 | |
| CN | 101612740 A | 12/2009 | |
| CN | 102019624 A | 4/2011 | |
| CN | 102271876 A | 12/2011 | |
| CN | 102806571 B | 12/2012 | |
| CN | 102909733 A | 2/2013 | |
| CN | 103507094 A | 1/2014 | |
| CN | 203557405 U | 4/2014 | |
| CN | 103921288 A | 7/2014 | |
| CN | 204054091 U | 12/2014 | |
| CN | 105595344 A | 5/2016 | |
| CN | 106938472 B | 7/2017 | |
| CN | 107175699 B | 9/2017 | |
| CN | 107351137 A | 11/2017 | |
| CN | 206733072 U | 12/2017 | |
| CN | 206913200 U | 1/2018 | |
| CN | 107660174 B | 2/2018 | |
| CN | 107756458 A * | 3/2018 | |
| CN | 107813348 A | 3/2018 | |
| CN | 207172156 U | 4/2018 | |
| CN | 108274496 A | 7/2018 | |
| CN | 108501048 A | 9/2018 | |
| CN | 207915530 U | 9/2018 | |
| CN | 109500842 A | 3/2019 | |
| CN | 109664340 A * | 4/2019 | B26B 19/28 |
| CN | 109676646 A | 4/2019 | |
| CN | 208729853 U | 4/2019 | |
| CN | 109849058 A * | 6/2019 | |
| CN | 208992761 U | 6/2019 | |
| CN | 209257021 U | 8/2019 | |
| CN | 110340947 A | 10/2019 | |
| CN | 210589412 U | 5/2020 | |
| CN | 210678795 U | 6/2020 | |
| DE | 202009004051 U1 | 8/2010 | |
| DE | 102009050344 A1 | 5/2011 | |
| EP | 1637293 B1 | 6/2008 | |
| EP | 2298512 A1 | 3/2011 | |
| EP | 2298511 B1 | 10/2012 | |

(56) References Cited

FOREIGN PATENT DOCUMENTS

| | | | |
|---|---|---|---|
| EP | 2769812 | B1 | 11/2017 |
| EP | 3666114 | A1 | 6/2020 |
| EP | 3573797 | B1 | 7/2020 |
| FR | 2542660 | A1 | 9/1984 |
| FR | 2660589 | A1 * | 10/1991 |
| JP | S5478260 | A | 6/1979 |
| JP | 2005312523 | A | 11/2005 |
| JP | 2007029382 | A | 2/2007 |
| JP | 2011062446 | A | 3/2011 |
| JP | 05568420 | B2 | 8/2014 |
| WO | 1998036880 | A1 | 8/1998 |
| WO | 2015043354 | A1 | 4/2015 |

OTHER PUBLICATIONS

The Lorentz Force Law (Year: 2005).*
FR-2660589-A1 (Year: 2025).*
CN-109664340-A, Translation (Year: 2025).*
Extended European Search Report for European Application No. 20835428.2 issued on Jun. 13, 2023, 7 pages.
International Search Report for European application PCT/US 20/40416, Sep. 4, 2020, 1 page.

* cited by examiner

ELECTRIC GROOMING APPLIANCE INCLUDING MAGNETIC COUPLING SYSTEM

This application is a 371 national stage of PCT Application No. PCT/US2020/040416 filed on Jul. 1, 2020 which claims the benefit of U.S. Provisional Patent Application Ser. No. 62/869,428 filed on Jul. 1, 2019, which are incorporated by reference herein in their entirety.

FIELD OF DISCLOSURE

The present disclosure relates generally to an electric grooming appliance, and more specifically an electric grooming appliance that includes a magnetic coupling system that releasably attaches a grooming device to a handle.

BACKGROUND OF THE DISCLOSURE

Many types of electric grooming appliances are available for performing grooming operations. For example, such electric grooming appliances include curling irons, flat irons (which are also sometimes referred to as heated tongs or hair straighteners), blow dryers, hair setters (also known as hot rollers or curlers), electric hair removers (e.g., laser hair removal devices, intense pulsed light (IPL) devices, and epilators), electric hair cutting devices (e.g., foil shavers, rotary shavers, trimmers, and clippers), skincare devices, brushes, and massagers.

Typically, an electric grooming appliance includes a grooming device attached to a handle. During operation, the grooming device must be engaged with and precisely aligned relative to a drive system to allow the grooming device to operate properly. Sometimes, the grooming device is removed from the handle for cleaning the appliance and/or to repair or replace at least a portion of the grooming device. For example, some hair grooming appliances include grooming devices that may be removed to provide access to a hair pocket and facilitate removal of hairs and debris from the hair pocket of the appliance. Accordingly, some grooming appliances include complicated mechanisms to secure the grooming device to the handle and allow selective release of the grooming device. However, the grooming devices can be difficult to remove from and attach to the handle. In addition, the securement mechanisms may include separate pieces that can be lost or damaged when the grooming device is detached from the handle.

Therefore, there is a need for a coupling mechanism that securely attaches a grooming device to a handle during use and allows for manual removal of the grooming device from the handle.

SUMMARY

In one aspect, a handheld grooming appliance includes a housing defining a handle, a head, and an interior space. The handheld grooming appliance also includes a drive system including a motor disposed in the interior space. The handheld grooming appliance further includes a grooming device operatively connected to the motor and supported by the head of the housing. The handheld grooming appliance also includes a magnetic coupling system configured to releasably attach the grooming device to the housing. The magnetic coupling system includes at least one first magnet located on the grooming device and at least one second magnet located on the housing. The first magnet and the second magnet provide an attractive force to secure the grooming device to the housing during operation of the handheld grooming appliance. The magnetic coupling system is arranged to allow selective detachment of the grooming device from the housing when a user applies a force greater than the attractive force between the first and second magnets.

In another aspect, a grooming device for a handheld electric hair grooming appliance includes a blade assembly including a movable blade and a stationary blade. The grooming device also includes a magnetic coupling system configured to releasably attach the grooming device to a housing of the handheld electric hair grooming appliance. The magnetic coupling system includes at least one first magnet located on the grooming device and providing an attractive force for securing the grooming device to the housing during operation of the grooming appliance. The magnetic coupling system being arranged to allow selective detachment of the grooming device from the housing when a user applies a force greater than the attractive force of the magnetic coupling system.

In yet another aspect, a method for assembling a handheld grooming appliance includes positioning a grooming device relative to a housing and releasably attaching the grooming device to the housing using a magnetic coupling system. The magnetic coupling system includes a first magnet located on the grooming device and a second magnet located on the housing. The first magnet and the second magnet provide an attractive force to secure the grooming device to the housing during operation of the handheld grooming appliance. The magnetic coupling system is arranged to allow selective detachment of the grooming device from the handle when a user applies a force to the grooming device greater than the attractive force between the first and second magnets.

BREIF DESCRIPTION OF THE DRAWINGS

DETAILED DESCRIPTION OF THE DRAWINGS

The present disclosure contemplates multiple embodiments of a grooming appliance descripted herein and illustrated in the accompanying figures. The grooming appliance includes a magnetic coupling system that releasably attaches a grooming device to a handle of the grooming appliance. The magnetic coupling system retains the grooming device in position during use and allows for manual removal of the grooming device. Moreover, the magnetic coupling system does not require complicated mechanisms, actuators, or fasteners to secure the grooming device in position and to release the grooming device.

Figure 1:
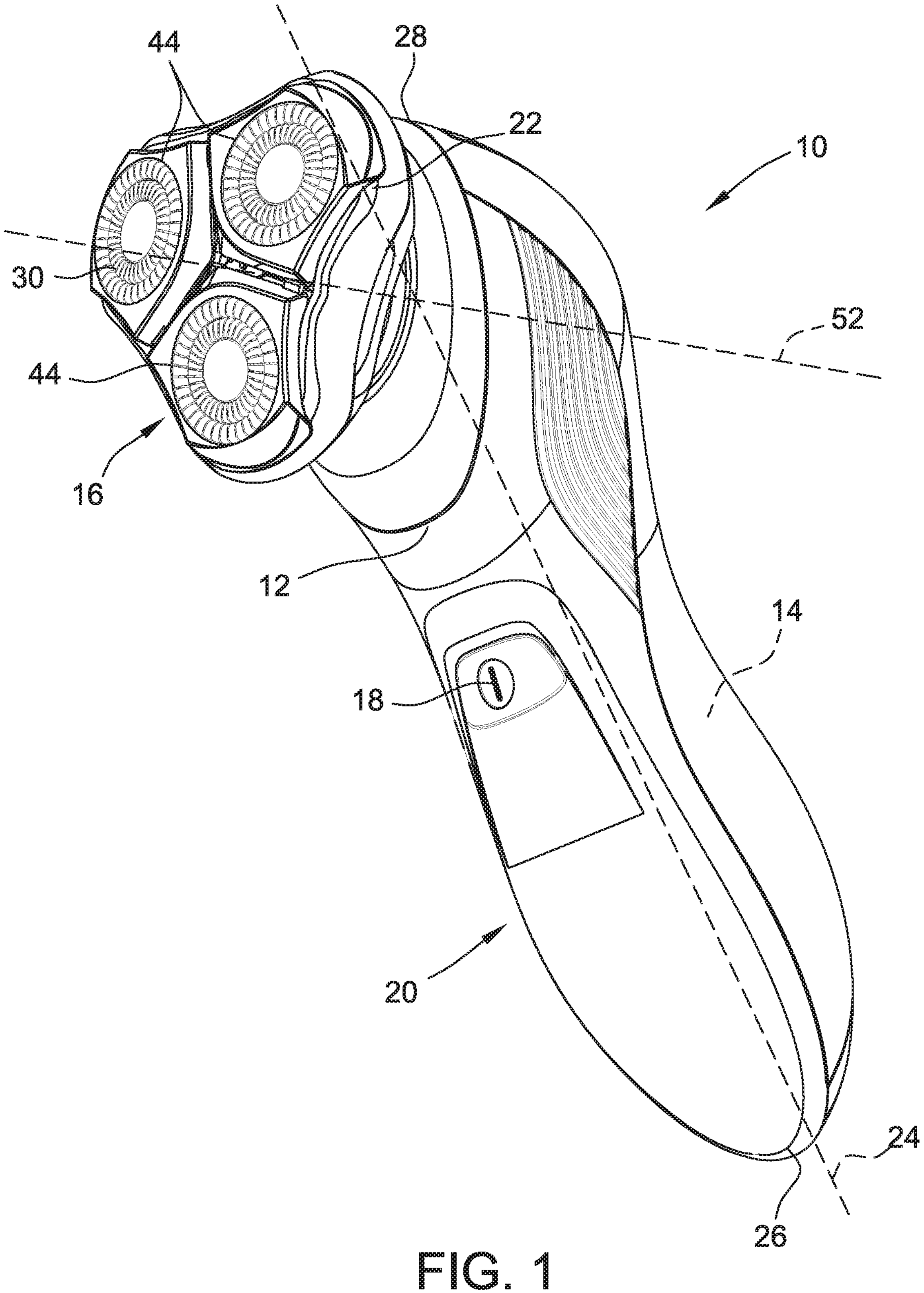
FIG. 1 is a perspective view of one suitable embodiment of an electric handheld grooming appliance, the electric handheld grooming appliance having a grooming device attached to a housing including a neck that is attached to a handle.

Referring to FIG. 1, an electric handheld grooming appliance of one suitable embodiment of the present disclosure is indicated generally at 10. The handheld grooming appliance 10 includes a housing 12 and a grooming device indicated at 16. A motor (not shown) is disposed within an interior space 14 of the housing 12. The motor is operatively connected to the grooming device 16 to drive operation of the grooming device 16 when the handheld grooming appliance 10 is in an ON state. The handheld grooming appliance 10 may include a user interface such as a power switch 18 to switch the handheld grooming appliance 10 between the ON state and an OFF state. In some embodiments, the handheld grooming appliance 10 may include a power source such as a battery allowing cordless operation of the handheld grooming appliance 10. In other embodiments, the handheld grooming appliance 10 may be connected to an external power source during operation and/or for charging of the internal power source.

The housing 12 defines a handle, indicated at 20, and a head, indicated at 22. The handle 20 is configured to be grasped by a user and allow positioning of the grooming device 16 to perform a grooming operation when the grooming appliance 10 is in an ON state. The power switch 18 and/or another suitable user interface may be positioned on the handle 20. As illustrated in FIG. 1, the handle 20 is elongate and extends along a longitudinal axis 24 from a first end 26 to a second end 28. In other embodiments, the grooming appliance 10 may include any suitable housing 12 that enables the grooming appliance to operate as described herein.

The grooming device 16 is supported by the head 22 and is arranged to perform a grooming operation during use of the grooming appliance 10. In the illustrated embodiment, the grooming device 16 includes a blade assembly 30 and is configured as a hair cutting device. Specifically, in the illustrated embodiment, the grooming device 16 is configured as a rotary shaver. In other embodiments, the grooming appliance 10 may include any suitable grooming device 16 including, for example and without limitation, a shaver, an epilator, a hair trimming device, an intense pulsed light (IPL) device, a laser device, a skincare device, a brush, a massager, and/or any other suitable grooming device.

Figure 2:
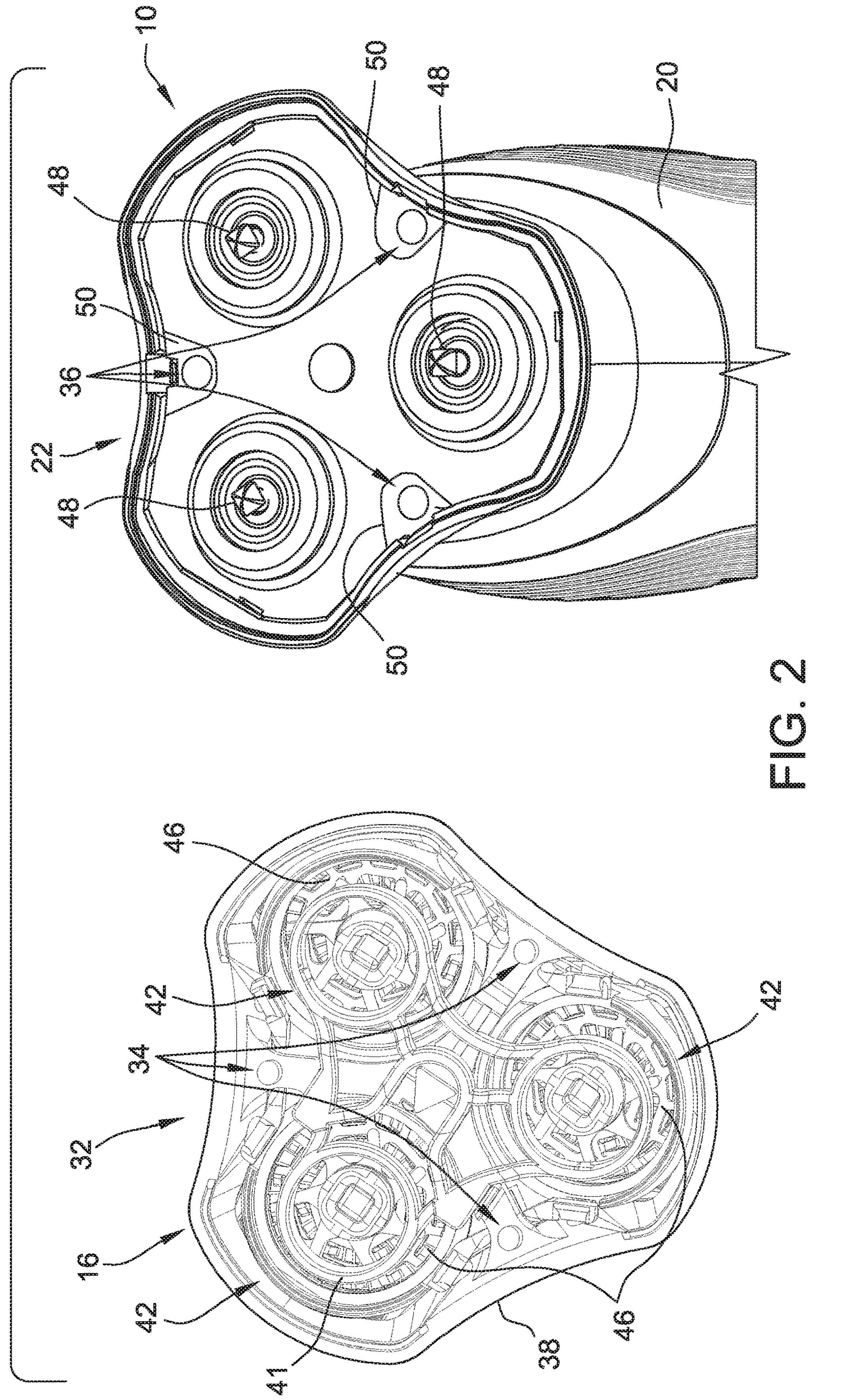
FIG. 2 is a partial perspective view of the electric handheld grooming appliance shown in FIG. 1 with the grooming device detached from the housing.

FIG. 2 is a perspective view of the electric handheld grooming appliance 10 with the grooming device 16 removed from the housing 12. The handheld grooming appliance 10 includes a magnetic coupling system 32 releasably attaching the grooming device 16 to the housing 12. The magnetic coupling system 32 includes at least one first magnet 34 mounted on the grooming device 16 and at least one second magnet 36 mounted on the head 22. Each of the first magnets 34 are arranged to align with and attract a corresponding one of the second magnets 36 when the grooming device 16 is in an operative position. Each magnet 34, 36 has a circular disc shape with a substantially planar surface that is positioned to align with the planar surface of the opposite, corresponding magnet when the grooming device 16 is attached to the handle 20. In the illustrated embodiment, the magnetic coupling system 32 includes three pairs of first and second magnets 34, 36. In other embodiments, the magnetic coupling system 32 may include any magnets 34, 36 that enable the magnetic coupling system 32 to operate as described herein. For example, in some embodiments, the magnetic coupling system 32 includes at least one magnet 34, 36 that attracts and attaches to a material on the housing 12 that is not a second magnet. In further embodiments, the first magnets 34 and the second magnets 36 may not directly contact each other when the grooming device 16 is secured in position by the magnetic coupling system 32.

The magnetic coupling system 32 provides an attractive force sufficient to retain the grooming device 16 to the handle 20 during a grooming operation. In addition, the magnetic coupling system 32 is arranged to allow selective detachment of the grooming device 16 from the handle 20 when a user applies a force to the grooming device that is greater than the attractive force between the first and second magnets 34, 36. For example, each of the first magnets 34 and the second magnets 36 provides a magnetic field with a strength in range of about 400 Guass to about 5,500 Guass. In addition, the attractive force between the first magnet 34 and the second magnet 36 is in range of about 5 Newton to about 35 Newton when the grooming device 16 is secured to the handle 20. In some embodiments, the attractive force between the first magnet 34 and the second magnet 36 is in range of about 5 Newton to about 10 Newton or about 15 Newton to about 35 Newton. In other embodiments, the magnets 34, 36 may have any strength that enables the magnetic coupling system 32 to function as described herein. For example, in some embodiments, the magnets 34, 36 may have different strengths and at least one of the first magnets 34 or the second magnets 36 may be significantly stronger than other magnets 34, 36.

The blade assembly 30 includes at least one blade set 42 including a stationary blade 44 and a movable blade 46.

Each movable blade 46 is coupled to a drive shaft 48 coupled to the motor. In the illustrated embodiment, the blade assembly 30 includes three blade sets 42. In alternative embodiments, the grooming device 16 may include any blade assembly 30 that enables the grooming appliance 10 to operate as described herein.

In this illustrated embodiment, the head 22 remains attached to the handle 20 when the grooming device 16 is removed from the handle 20. Specifically, the head 22 is permanently attached to the handle 20. The grooming device 16 includes an upper housing 38 that supports the blade assembly 30 of the grooming device 16 such that the blade assembly 30 and the upper housing 38 can be removed from the head 22 as a single assembly. For example, the grooming device 16 includes a retainer 41 that engages and retains the blade assembly 30 on the upper housing 38 when the grooming device 16 is removed from the head 22 and the handle 20. In other embodiments, the head 22 may be releasably attached to the handle 20 by the magnetic coupling system 32. For example, at least one of the second magnets 36 may be positioned on the handle 20 and arranged to engage at least one first magnet 34 mounted on the head 22.

The first magnets 34 are mounted on the upper housing 38 of the grooming device 16. The first magnets 34 are located proximate a perimeter of the upper housing 38 and extend outward from the upper housing 38 along a head axis 52 beyond the blade assembly 30 and the retainer 41. The second magnets 36 are positioned in recesses 50 of the head 22. The recesses 50 are sized to receive the first magnets 34 when the first magnets 34 are moved toward and attached to the second magnets 36. Accordingly, the recesses 50 act as alignment features and guide the grooming device 16 into operative alignment with a drive system of the grooming appliance 10 when the first magnets 34 are attached to the second magnets 36. In alternative embodiments, the first magnets 34 and the second magnets 36 may be arranged in any manner that enables the grooming appliance 10 to function as described herein. For example, in some embodiments, the first magnets 34 and the second magnets 36 may or may not be positioned in recesses 50.

During use, a user may grasp the handle 20 and position the grooming device 16 proximate an area to be groomed. The user may switch the grooming appliance 10 to the ON state and perform a grooming operation. After the grooming operation, the user may remove the grooming device 16 from the handle 20 by applying a force to the grooming device that is greater than the attractive force between the first magnets 34 and the second magnets 36. For example, the user may remove the grooming device 16 to allow for cleaning or repair of the grooming appliance 10. In addition or alternatively, the user may remove the grooming device 16 to replace the grooming device 16 on the handle 20 with an alternative grooming device 16. The magnetic coupling system 32 allows for simple removal of the grooming device 16 and provides a secure attachment of the grooming device 16 during operation of the grooming appliance 10. Suitably, the magnetic coupling system 32 does not require an actuator or locking mechanism to allow removal and attachment of the grooming device 16. The user removes the grooming device 16 by simply applying a force to the housing 12 in a direction perpendicular to the engagement surfaces of the magnets 34, 36. In some embodiments, the housing 12 may include one or more grips to facilitate the user removing and/or attaching the grooming device 16 from the handle 20. To attach the grooming device 16 to the handle 20, a user positions the grooming device 16 such that the first magnets 34 are proximate the second magnets 36 and such that the magnetic fields of the corresponding magnets overlap. As the first magnets 34 approach the second magnets 36 the attraction between the magnets increases and the magnets are pulled together. The magnets 34, 36 are arranged such that the grooming device 16 automatically aligns on the handle 20 in an operative position when the first magnets 34 are attached to the second magnets 36. The magnets 34, 36 provide a secure attachment force that is greater than forces experienced during the grooming operation. In some embodiments, the magnets 34, 36 directly contact each other. In alternative embodiments, one or more materials extend between the magnets 34, 36 to maintain a distance between the magnets 34, 36 that provides the desired attractive force between the magnets 34, 36.

Figure 3:
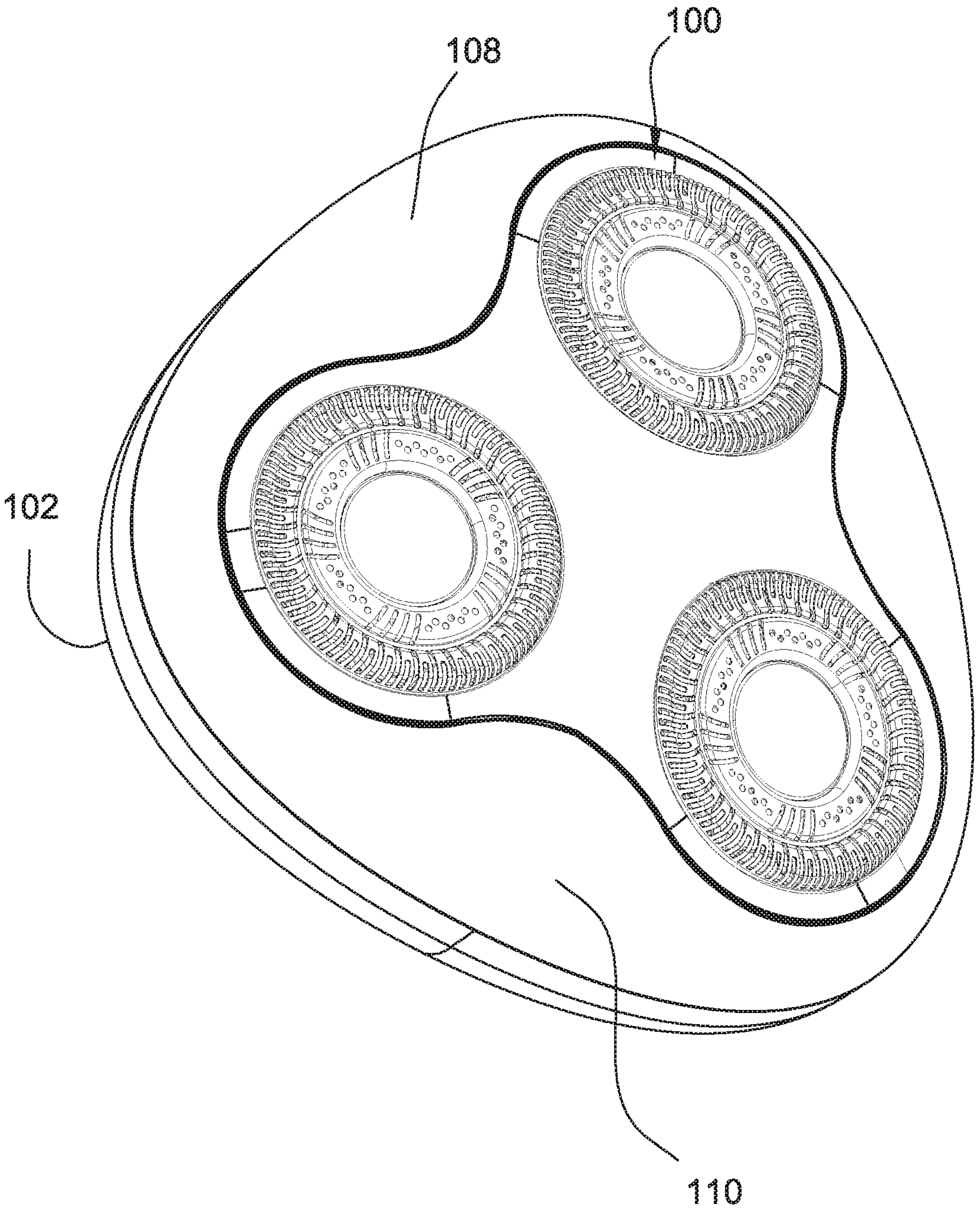
FIG. 3 is an enlarged perspective view of a grooming device for use with an electric handheld grooming appliance.
Figure 4:
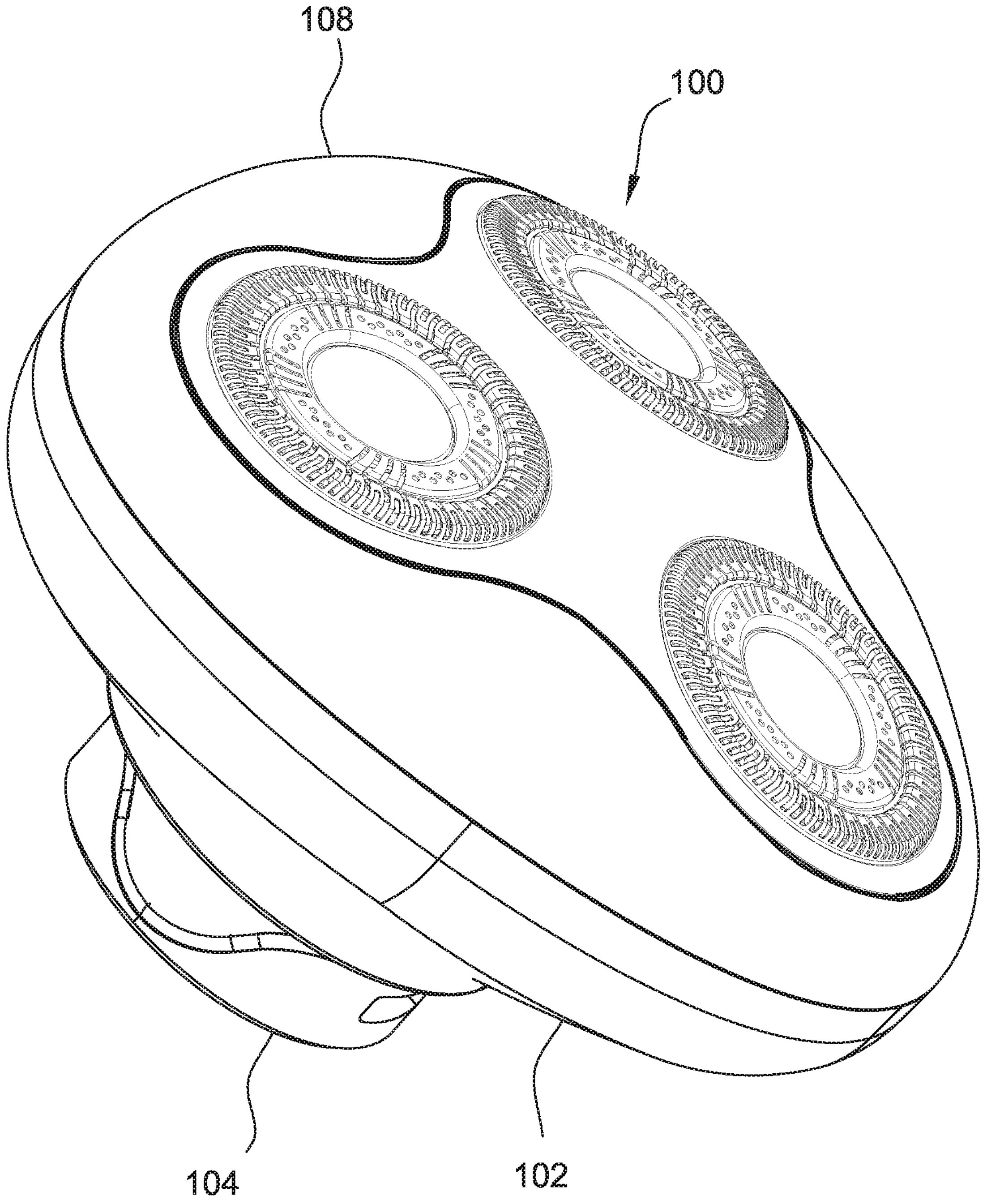
FIG. 4 is a perspective view of the grooming device shown in FIG. 3 attached to a housing including a neck that is attachable to a handle.
Figure 5:
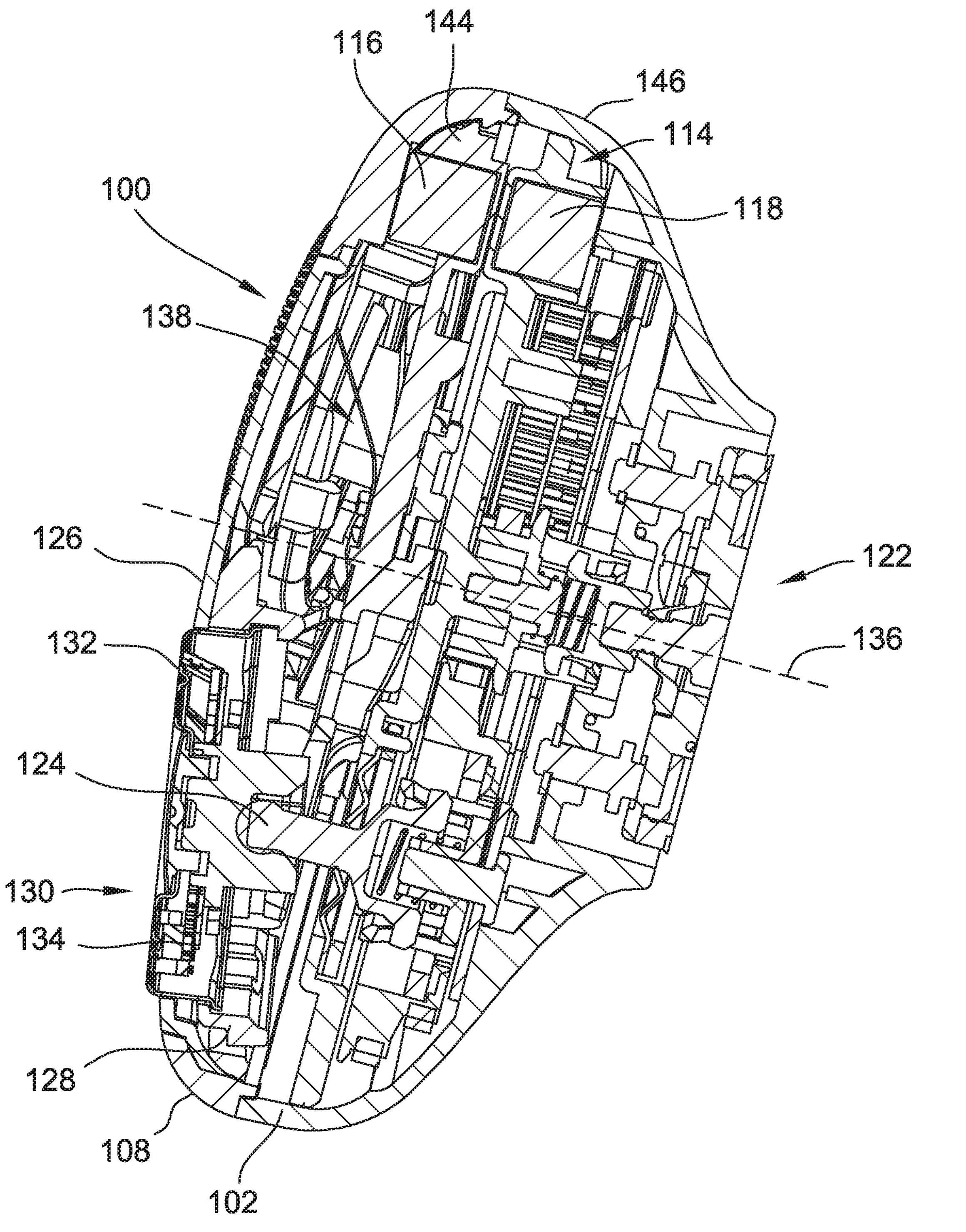
FIG. 5 is a sectional view of the grooming device shown in FIG. 3 showing a magnetic coupling system that attaches the grooming device to the housing.

Referring to FIGS. 3-5, a grooming device for a grooming appliance of another suitable embodiment of the present disclosure is indicated generally at 100. The grooming device 100 is supported by a head 102 which may be permanently or releasably attached to a handle such as the handle 20 shown in FIG. 1. For example, the head 102 includes a neck 104 configured to attach to the handle 20 (shown in FIG. 1). A drive shaft (not shown) may be disposed at least partially within the neck 104 for connection to a motor (not shown) within the handle 20 (shown in FIG. 1). In alternative embodiments, the head 102 may be attached to any handle that enables the head 102 to function as described herein. In further embodiments, at least a portion of a motor or drive system may be disposed at least partially within the head 102.

The grooming device 100 includes a blade assembly and an upper housing 108 supporting the blade assembly. The grooming device 100 is retained on the upper housing 108 and is arranged to perform a grooming operation, specifically cutting hairs, during operation of the grooming appliance. The upper housing 108 is releasably attached to the head 102 by a magnetic coupling system 114. The magnetic coupling system 114 allows the upper housing 108 and the grooming device 100 to be easily removed from and attached to the head 102 as a single unit. Moreover, the magnetic coupling system 114 securely retains the grooming device 100 in an operating position and does not require additional components to attach the upper housing 108 to the head 102.

Figure 8:
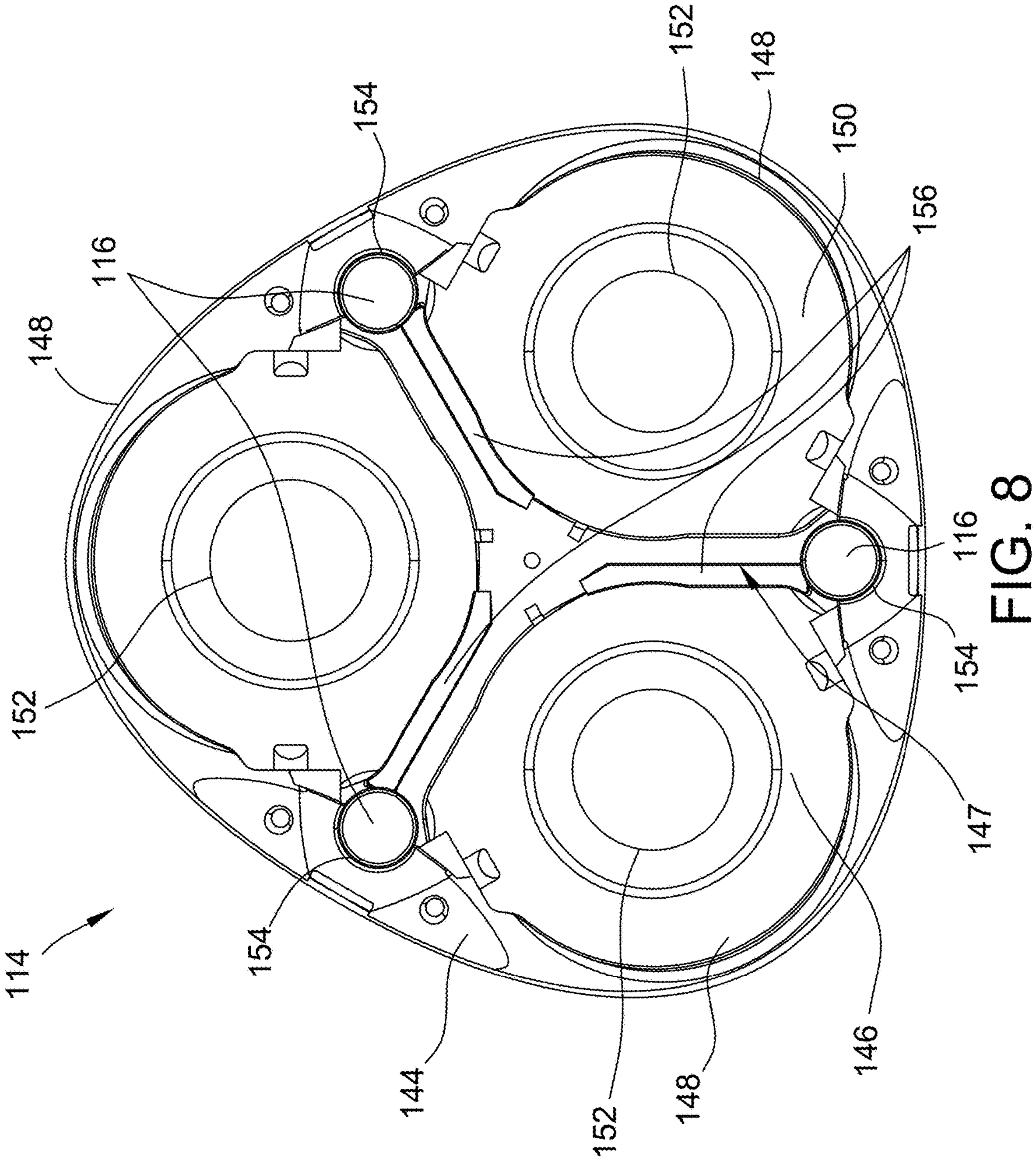
FIG. 8 is a perspective view of the magnetic coupling system for removably attaching the grooming device to a housing with the magnetic coupling system removed from the grooming device and the housing to illustrate components of the magnetic coupling system.
Figure 9:
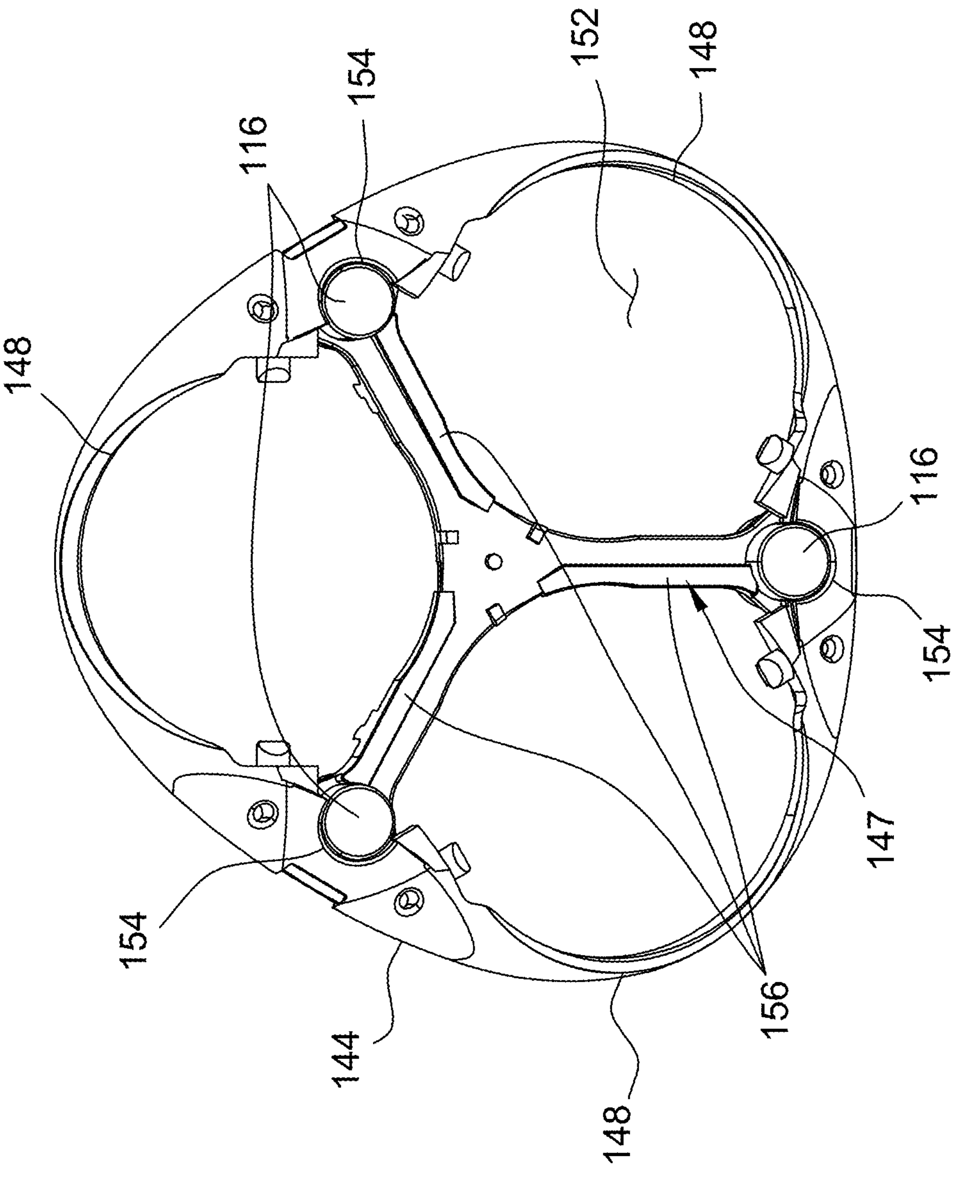
FIG. 9 is a top view of an upper magnet assembly of the magnetic coupling system shown in FIG. 8, with components of the grooming device removed to illustrate components of the upper magnet assembly.
Figure 10:
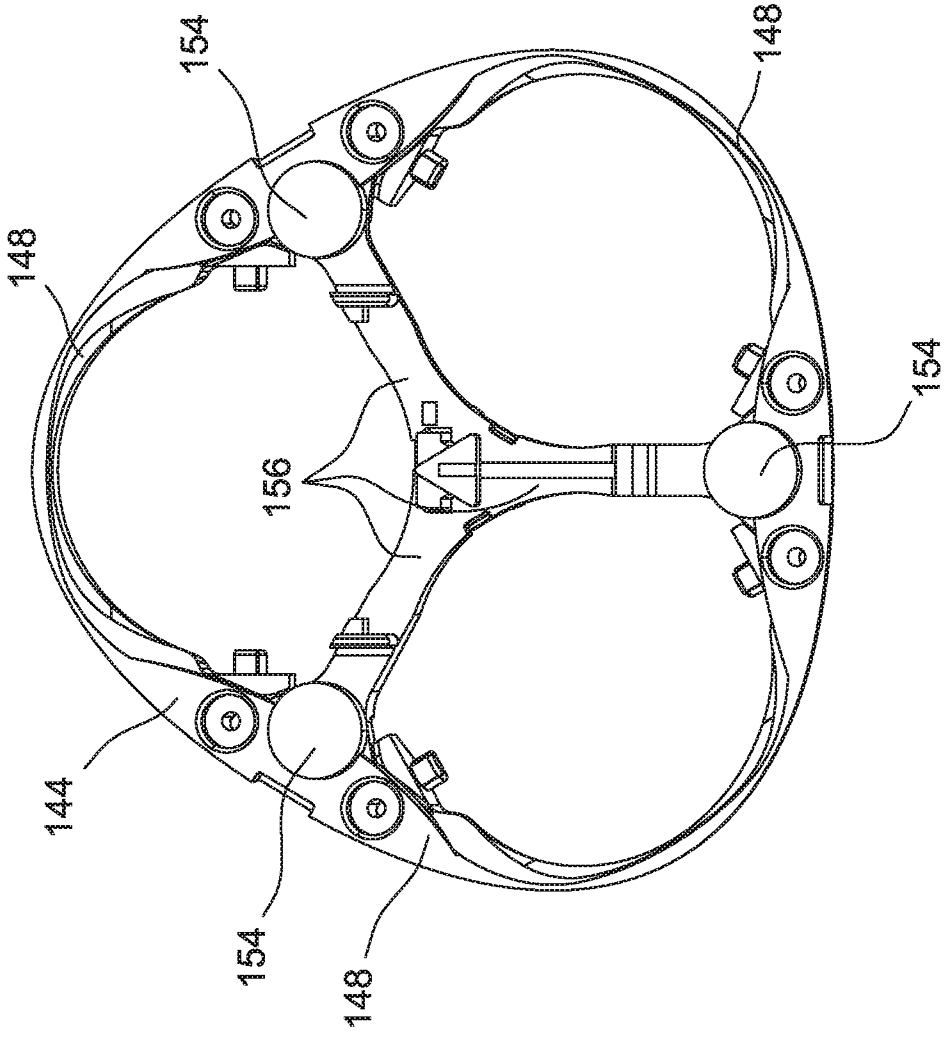
FIG. 10 is a bottom view of the upper magnet assembly shown in FIG. 9, the upper magnet assembly arranged to removably attach to a lower magnet assembly.
Figure 11:
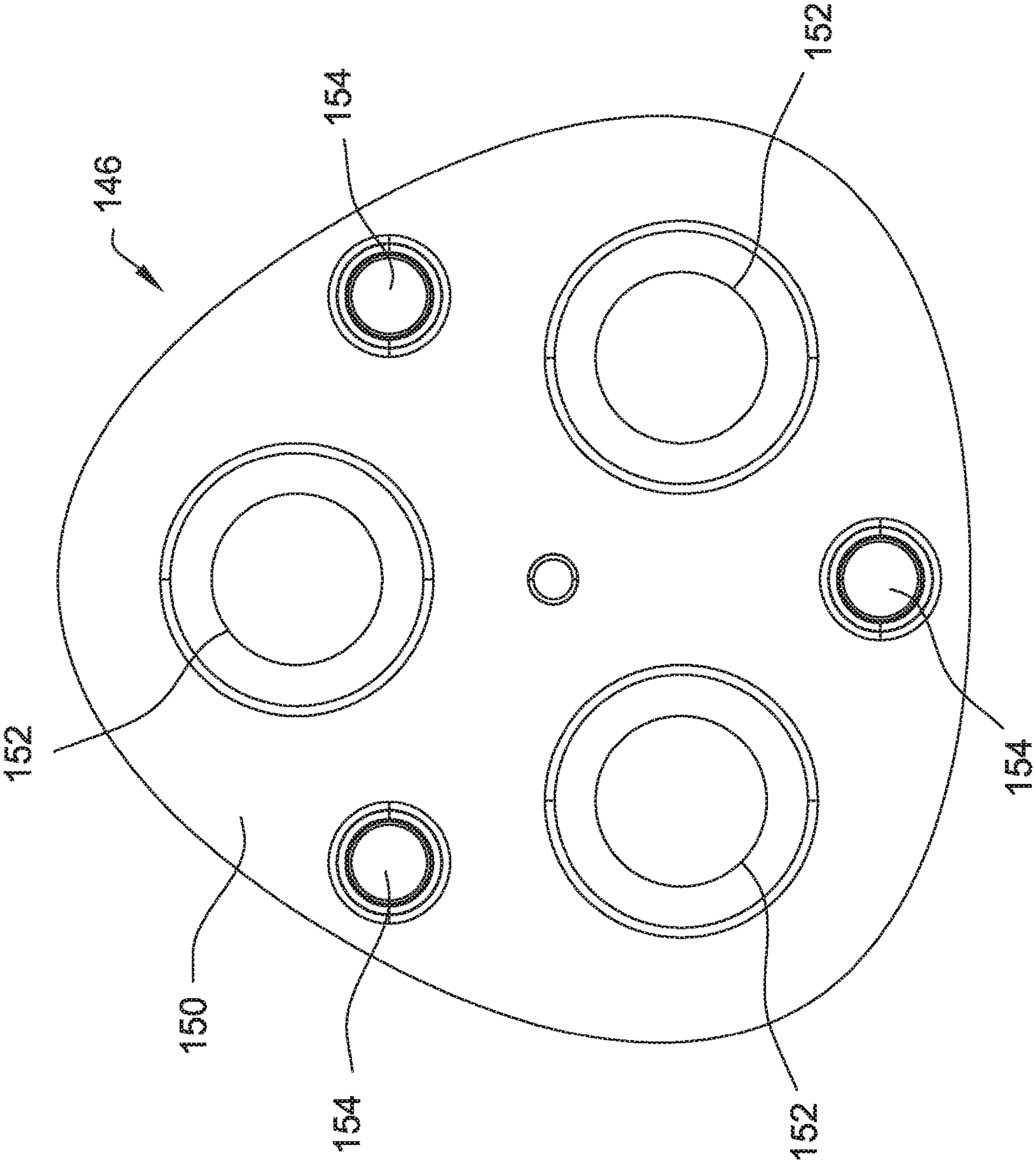
FIG. 11 is a top view of a lower magnet assembly of the magnetic coupling system shown in FIG. 8, the lower magnet assembly arranged to removably attach to the upper magnet assembly.
Figure 12:
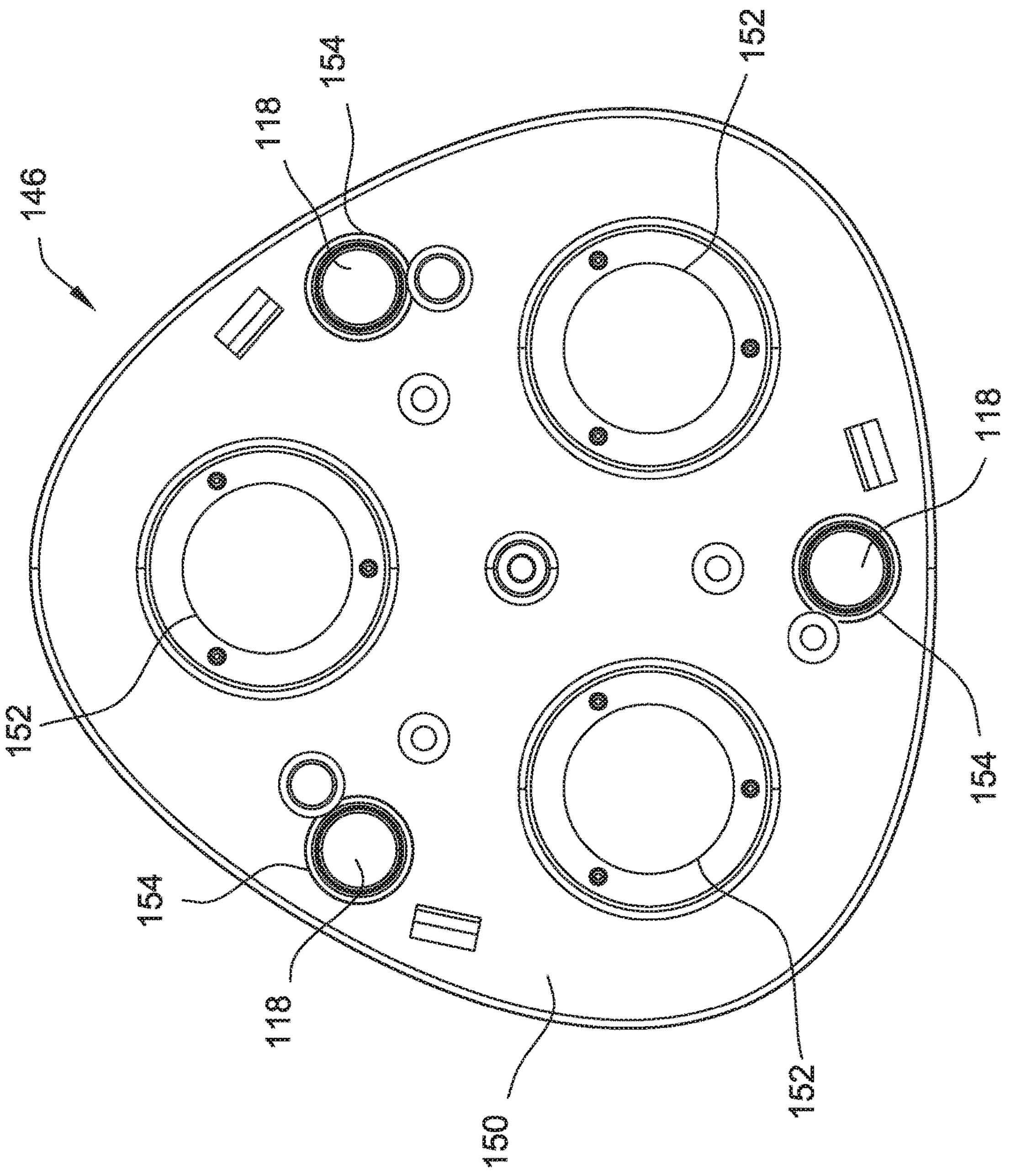
FIG. 12 is a bottom view of the lower magnet assembly shown in FIG. 11, with components of the grooming device removed to illustrate components of the lower magnet assembly.

The magnetic coupling system 114 includes first magnets 116 mounted on an upper magnet support 144 which is connected to the upper housing 108 and second magnets 118 mounted on a lower magnet support 146 which is connected to the head 102. The first magnets 116 and the second magnets 118 are arranged in corresponding patterns such that each first magnet 116 has an opposite second magnet 118. For example, the first magnets 116 are arranged on a Y-shaped frame 147 at distal ends of the Y-shaped frame (FIGS. 7-9) and the second magnets 118 are arranged on a Y-shaped frame at distal ends of the frame. As illustrated in FIGS. 8 and 9, the Y-shaped frame 147 includes three braces 156. The first and second magnets 116, 118 automatically align the upper housing 108 and the head 102 when the magnets 116, 118 are attached to each other. The upper housing 108 and the head 102 may include one or more alignment features such as clips or grooves that engage the other of the upper housing 108 and the head 102 to guide the grooming device 100 and the head 102 into alignment and facilitate the connection of the magnets 116, 118. In the example embodiment, the magnetic coupling system 114 allows the upper housing 108 to be connected to the head 102 without the use of alignment features or secondary attachments. In other embodiments, the magnetic coupling system 114 may have any arrangement of magnets 116 and/or magnets 118 that enable the head 102 to function as described herein.

The head 102 includes a drive system 122 at least partially contained within the neck 104. The drive system 122 may include an electric motor (not shown) and one or more drive shafts 124. In alternative embodiments, the drive assembly can include any components which enable the head 102 to function as described herein. The one or more drive shafts 124 may be connected to the electric motor such that the electric motor is configured to cause the drive shafts 124 to move in any manner which enables the head 102 to function as described herein. For example, in some embodiments, the drive system includes, without limitation, linkages, adhesives, and/or welding.

In this illustrated embodiment, the grooming device 100 includes a casing 126, a support frame 128, and a plurality of blade sets 130. The support frame 128 supports the blade sets 130 such that the blade sets 130 are configured to flex relative to the support frame 128 and relative to adjacent blade sets 130. The casing 126 is supported by the support frame 128 and at least partially covers at least one of the blade sets 130. The casing 126 may be made of a flexible material and is configured to move with the grooming device 100.

The blade sets 130 are arranged in a substantially triangular pattern relative to the support frame 128. Each blade set 130 includes an outer, stationary blade 132 and an inner, movable blade 134. The inner blades 134 are connected to the drive shafts 124 and configured to be reciprocated by the drive system 122 during operation of the grooming device. The inner blades 134 rotate relative to the outer blades 132 and the blade sets 130 are configured to cut hairs that extend between the blades. The grooming device 100 and the upper housing 108 can be positioned on the head 102 in three different orientations and the magnetic coupling system 114 will secure the grooming device 100 in operative alignment in each position. As a result, the alignment of the grooming device 100 for magnetic attachment to the head 102 is further simplified. In alternative embodiments, the grooming device 100 has any configuration that enables the head 102 to function as described herein.

Figure 6:
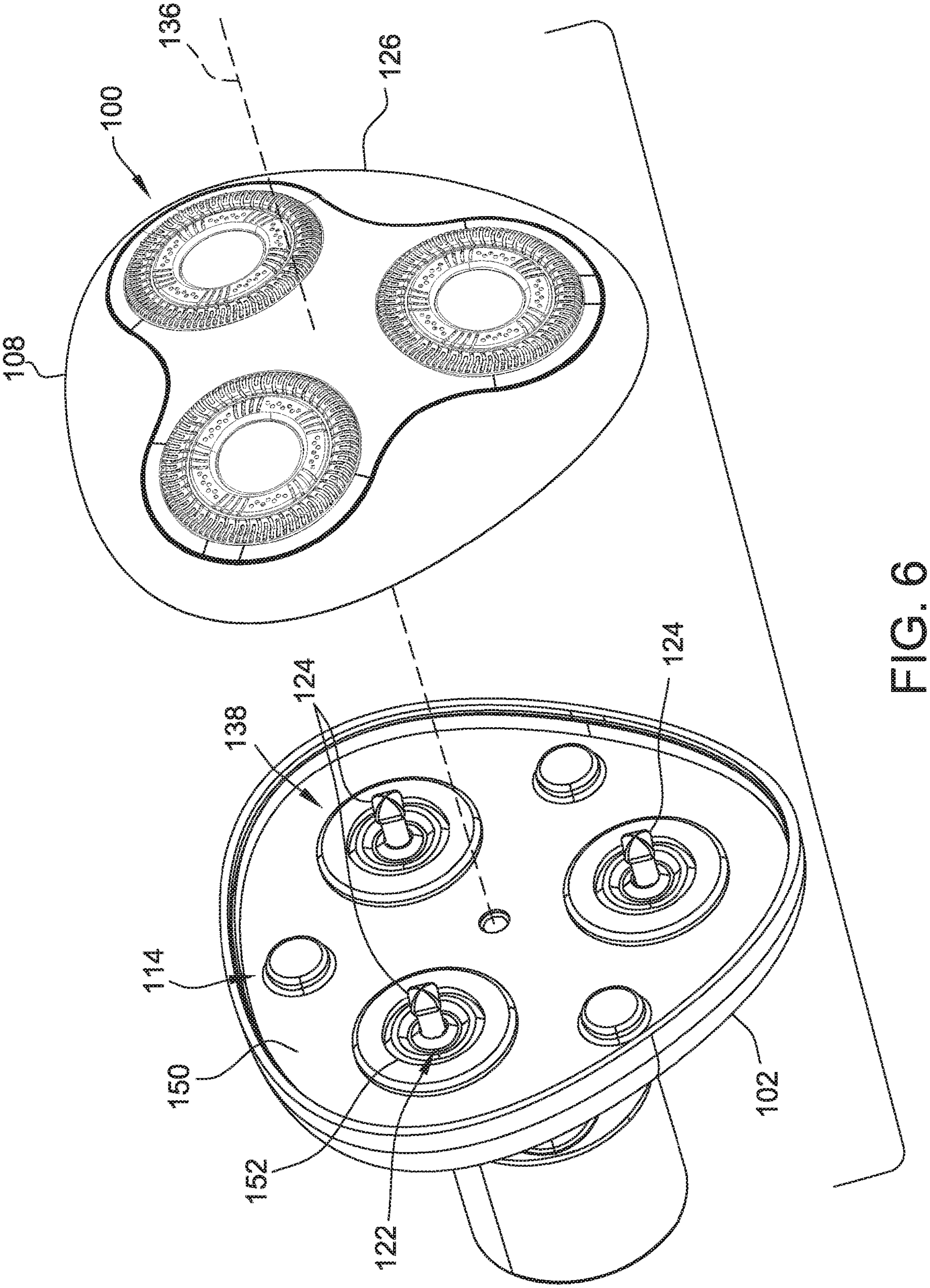
FIG. 6 is a perspective view of the grooming device shown in FIG. 4 with the grooming device detached from the housing.
Figure 7:
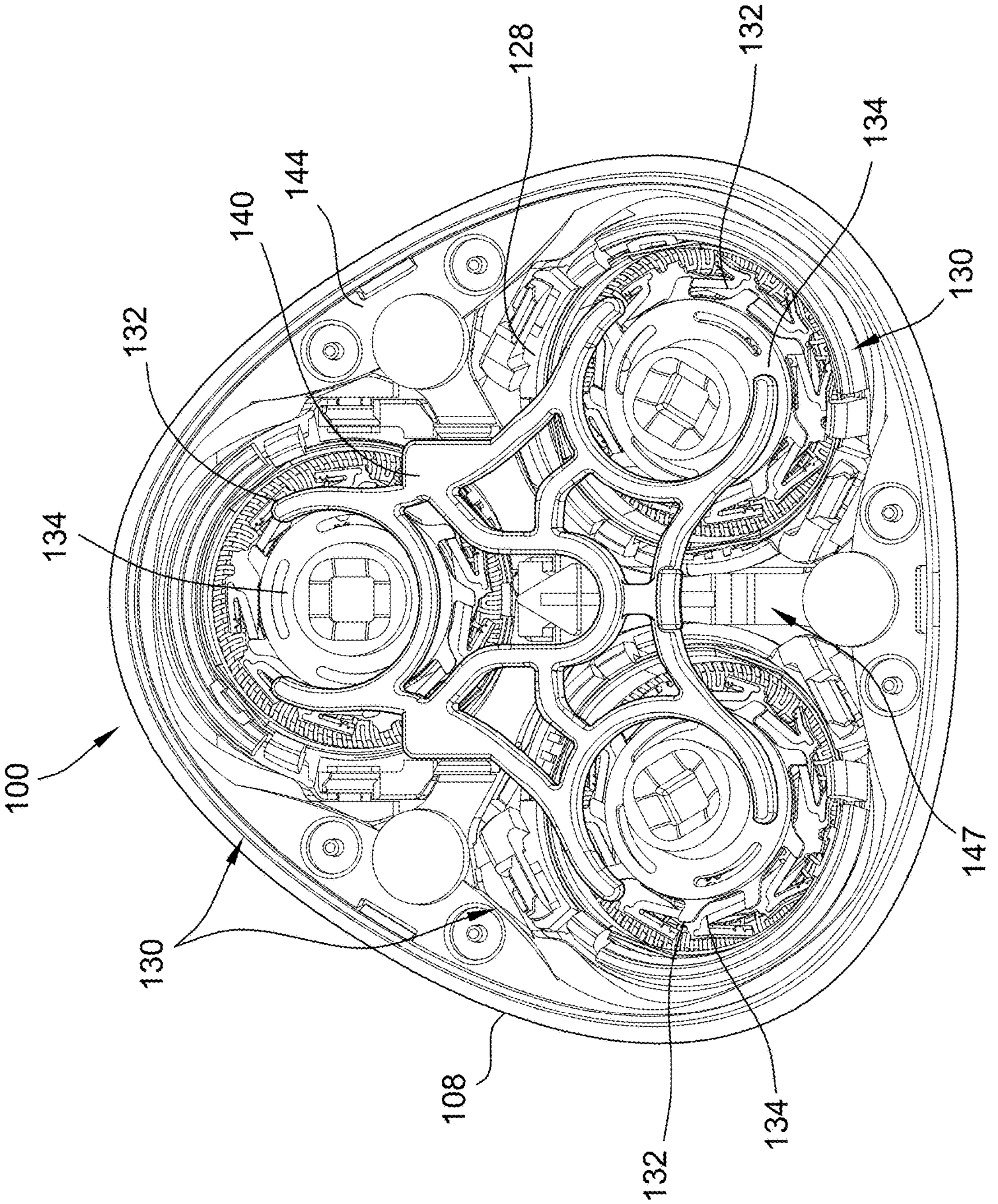
FIG. 7 is a bottom view of the grooming device shown in FIG. 6.

Referring to FIGS. 6 and 7, in the illustrated embodiment, the grooming device 100 is releasably mounted to the head 102 by the magnetic coupling system 114 such that a user may detach the blade assembly from the housing by applying a detaching force to the blade assembly in a direction away from the head 102 substantially along a head axis 136. The detaching force is substantially greater than forces applied during a grooming operation. Additionally, the detaching force is substantially in a different direction than forces applied during a grooming operation. For example, the grooming device 100 may experience forces oblique to a cutting plane and/or toward the handle during shaving. In contrast, the detachment force is away from the handle. When the magnetic coupling system 114 attaches the grooming device 100 to the head 102, each blade set 130 is aligned with and operatively connected to a respective drive shaft 124. The magnetic coupling system 114 provides a primary attachment of the grooming device 100 to the head 102 and maintains the blade assembly in operative connection with the drive system as portions of the grooming device 100 and the drive system reciprocate. In the illustrated embodiment, the magnetic coupling system 114 does not connect to any part of the drive system and remains substantially stationary during operation of the drive system.

In the illustrated embodiment, the upper housing 108, the head 102, and the grooming device 100 collectively define a hair pocket 138. When the grooming device 100 and the upper housing 108 are attached to the head 102, the grooming device 100, the upper housing 108, and the head 102 enclose the hair pocket 138. The hair pocket 138 is configured to capture and store hair that is cut during the grooming operation. The magnetic coupling system 114 allows a user to detach the grooming device 100 and the upper housing 108 from the head 102 to expose the hair pocket 138 and remove cut hair and debris from the hair pocket. In alternative embodiments, the hair pocket 138 may be omitted.

The upper housing 108 supports the grooming device 100 such that the grooming device 100 and the upper housing 108 can be removed from the head 102 as a single assembly. For example, the grooming device 100 includes a retainer 140 that engages and retains the blade assembly on the upper housing 108 when the upper housing 108 is removed from the head 102. The retainer 140 is displaceable relative to the upper housing 108 to release the blade assembly from the upper housing 108.

The upper magnet support 144 is configured to attach to the upper housing 108 and includes a plurality of openings 148 arranged to accommodate the blade assembly. The lower magnet support 146 is configured to attach to the head 102 and includes a wall 150 defining a plurality of openings 152 therein. The wall 150 forms a portion of the hair pocket 138 and prevents cut hairs from contacting a portion of the drive system. The plurality of openings 152 are arranged to accommodate the drive shafts 124. The openings 148, 152 of the magnet supports 144, 146 allow the grooming device 100 to connect to the drive shafts 124 when the upper housing 108 is coupled to the head 102.

Referring to FIGS. 8-12, the upper magnet support 144 and the lower magnet support 146 each include pockets 154 configured to receive the respective magnets 116, 118. Each magnet 116, 118 may be retained in its respective pocket 154 by a portion of the upper magnet support 144, the lower magnet support 146, the upper housing 108 (shown in FIG. 6), and/or the head 102 (shown in FIG. 6). In some embodiments, the magnets 116, 118 may be attached to the upper magnet support 144 or the lower magnet support 146 in any suitable manner that enables the magnetic coupling system 114 to function as described herein. For example and without limitation, the magnets 116, 118 may be secured in position by adhesives, welds, and fasteners. In further embodiments, the magnets 116 and/or the magnets 118 may form a portion of the upper magnet support 144, the lower magnet support 146, the upper housing 108, and/or the head 102.

The pockets 154 of the lower magnet support 146 are connected together by the wall 150. The pockets 154 of the upper magnet support 144 are connected together by braces 156 such that the upper magnet support 144 is a substantially open frame. The lower magnet support 146 and the upper magnet support 144 have a corresponding shape which corresponds to the overall shape of the grooming device 100 (shown in FIG. 6). Specifically, in the illustrated embodiment, the lower magnet support 146 and the upper magnet support 144 have a generally triangular shape.

The magnets 116, 118 are positioned within the pockets 154 such that the upper magnet support 144 and the lower magnet support 146 extend between the magnets 116, 118 to maintain a distance between the magnets 116, 118 that provides the desired attractive force between the magnets 116, 118. The upper magnet support 144 and the lower magnet support 146 directly contact each other and are the only material disposed between respective magnets 116, 118 when the upper housing 108 (shown FIG. 5) is attached to the lower housing (shown in FIG. 5). The magnetic fields of the magnets 116, 118 extend through the upper magnet support 144 and the lower magnet support 146. Suitably, the upper magnet support 144 and the lower magnet support 146 include materials such as plastics that do not affect the magnetic field. In some embodiments, at least one of the upper magnet support 144 and the lower magnet support 146 may be at least partially magnetized to facilitate attaching the grooming device 100 to the head 102.

Figure 13:
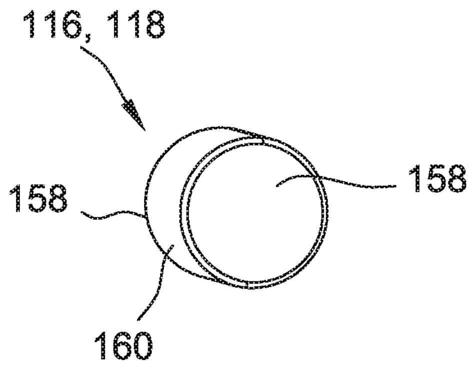
FIG. 13 is a perspective view of a magnet suitable for use with the magnetic coupling system shown in FIGS. 8-12.

As seen in FIG. 13, the magnets 116, 118 each include two ends 158 and a sidewall 160 extending between the ends 158. The ends 158 are circular and substantially planar. The sidewall 160 extends circumferentially about the ends 158. In addition, a diameter or width of each magnet 116, 118 is greater than its axial length. Accordingly, each magnet 116, 118 has a cylindrical disc shape. In other embodiments, the magnets 116, 118 may have any shape that enables the magnets to function as described herein.

Figure 14:
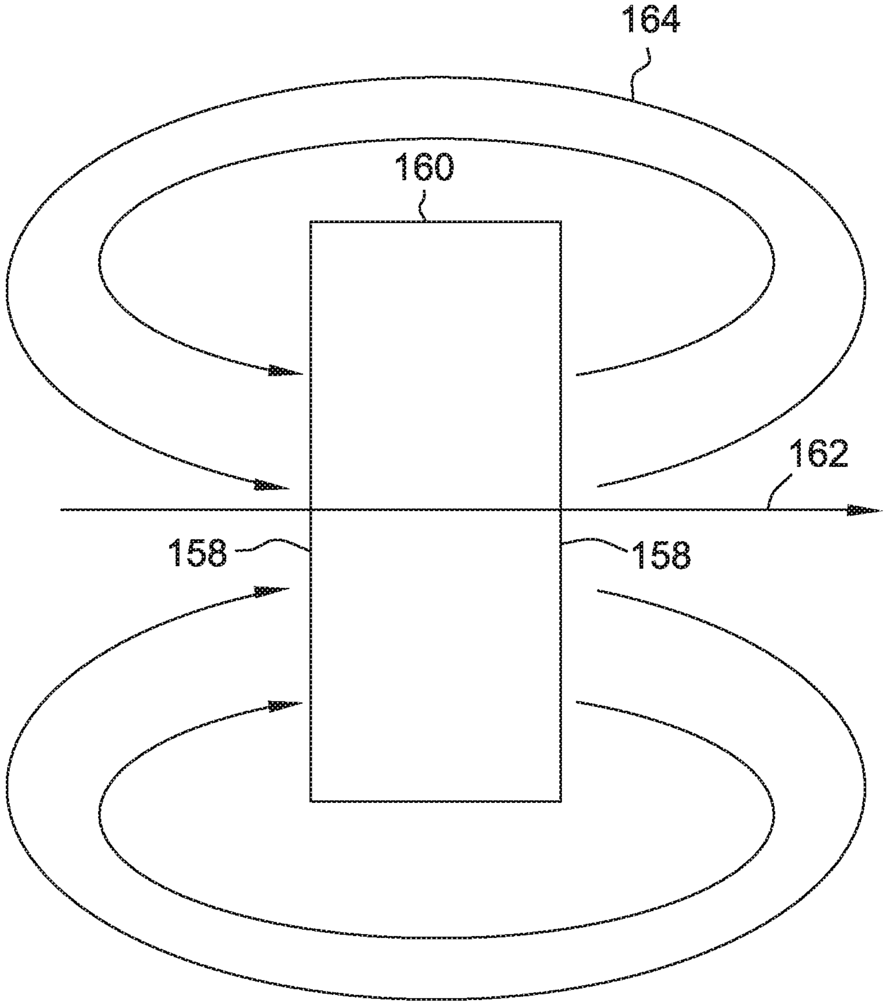
FIG. 14 is a schematic view of the magnet shown in FIG. 13, including magnetic field lines.

Referring to FIG. 14, each magnet 116, 118 has a direction of polarity 162 and a magnetic field 164. In the illustrated embodiment, the magnets 116, 118 are polarized axially, i.e., the magnet is charged such that the ends 158 have opposite charges. When the upper housing 108 (shown in FIG. 6) is coupled to the head 102 (shown in FIG. 6), the magnets 116, 118 may be arranged in the magnetic coupling system 114 (shown in FIG. 8) such that the ends 158 of the magnets 116, 118 having opposite charges are positioned adjacent each other and, as a result, the corresponding magnets 116, 118 attract each other. The magnets 116, 118 are arranged such that the attractive forces between the magnets 116, 118 are greater than the forces experienced during the grooming operation and less than a desired detachment force applied by a user along the head axis 136. For example, each of the first magnets 116 and the second magnets 118 provides a magnetic field with a strength in range of about 4,000 Guass to about 5,500 Guass. In addition, the attractive force between the first and second magnet is in a range of about 5 Newton (N) to about 10 N when the when the upper housing 108 is attached to the head 102 with the grooming device 100 in the operative position. In alternative embodiments, the magnets 116, 118 may have any magnetic field that enables the magnets to function as described herein.

Figure 15:
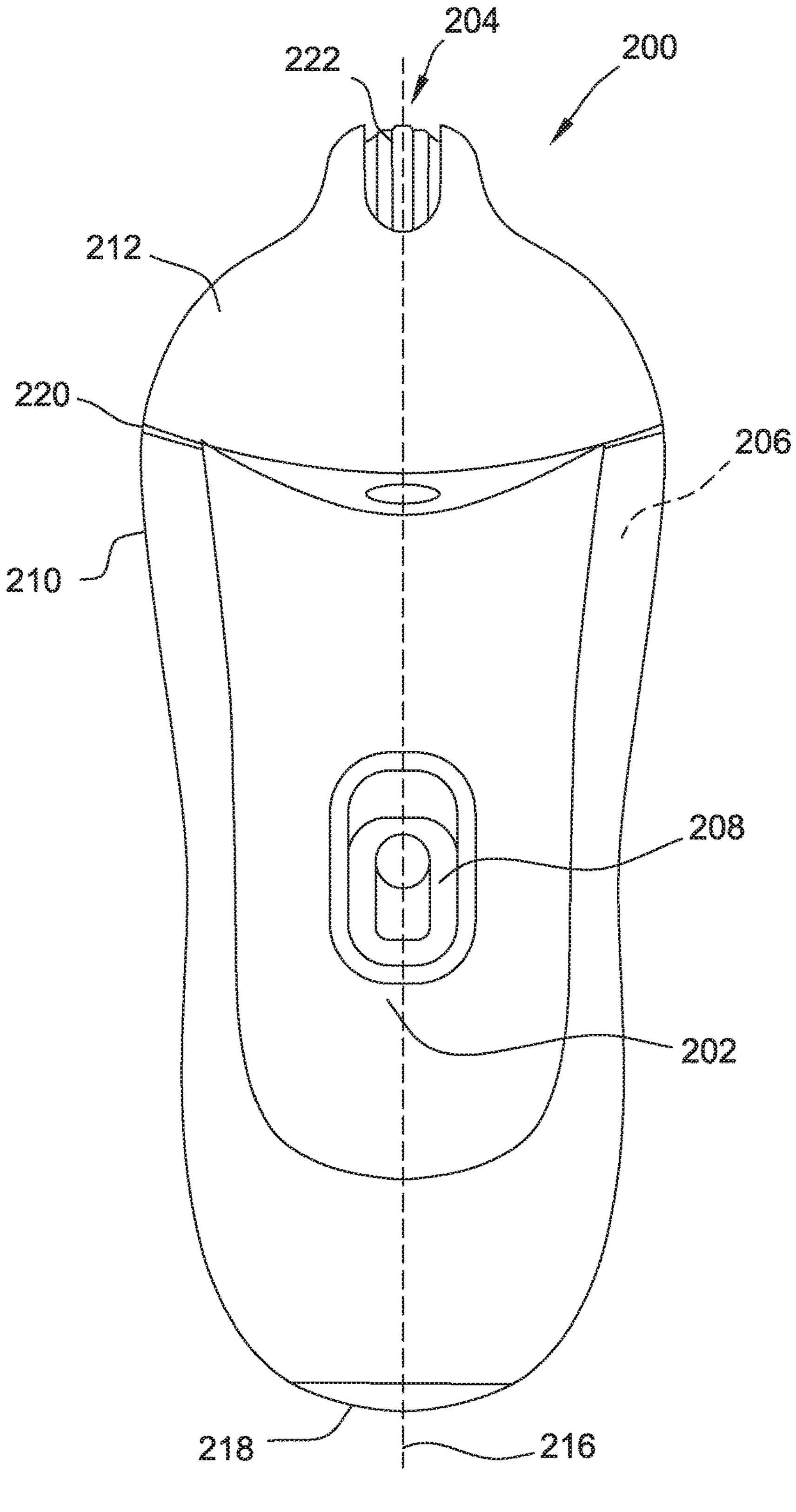
FIG. 15 is a front view of another suitable electric handheld grooming appliance, the electric handheld grooming appliance having a grooming device attached to a handle.
Figure 16:
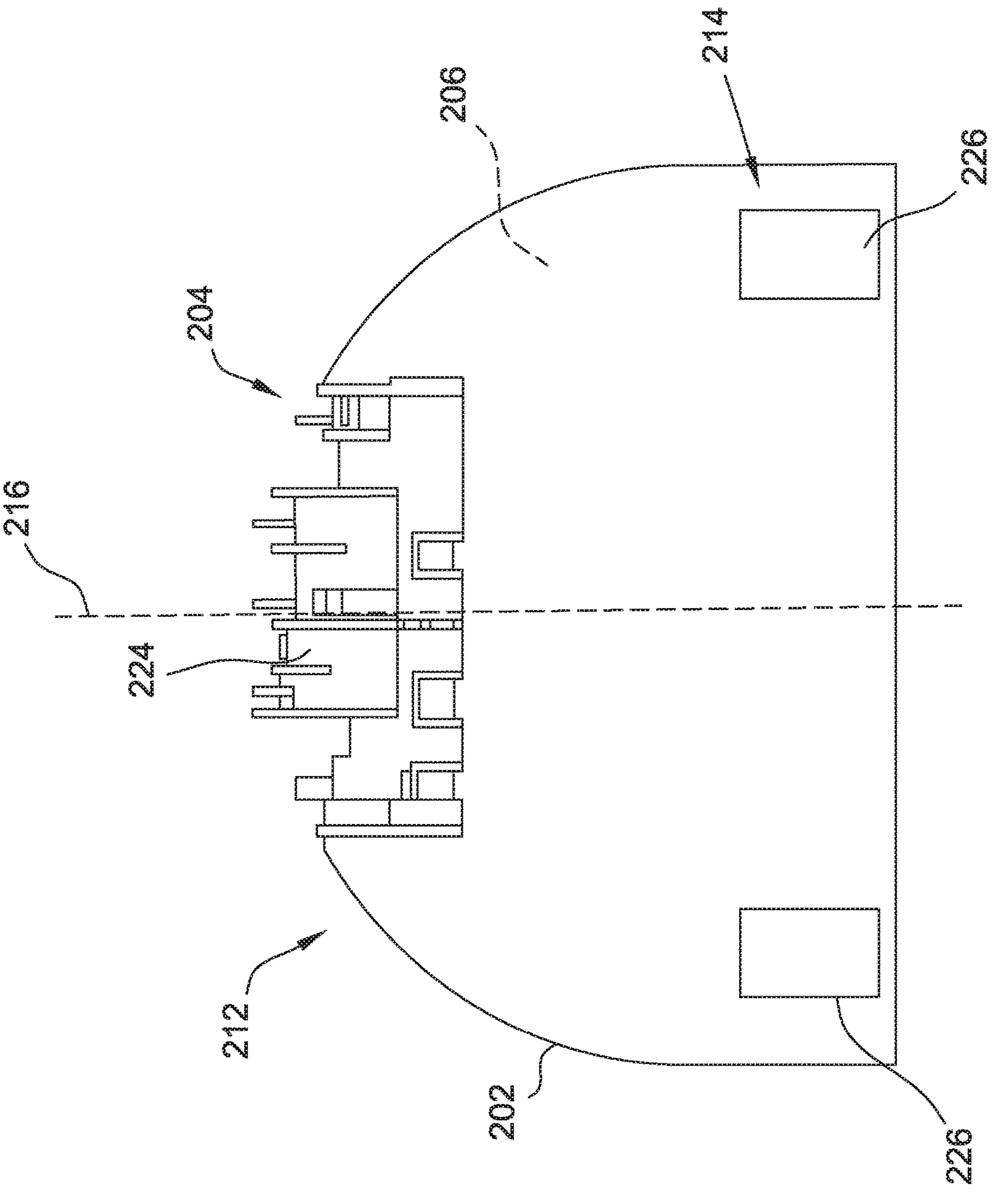
FIG. 16 is a schematic side view of the grooming device detached from the electric handheld grooming appliance shown in FIG. 15.

Referring to FIGS. 15 and 16, an electric handheld grooming appliance of another suitable embodiment of the present disclosure is indicated generally at 200. The handheld grooming appliance 200 includes a housing 202 and a grooming device 204. A motor is disposed within an interior space 206 of the housing 202. The motor is operatively connected to the grooming device 204 to drive operation of the grooming device when the handheld grooming appliance 200 is in an ON state. The handheld grooming appliance 200 may include a user interface such as a power switch 208 to switch the handheld grooming appliance 200 between the ON state and an OFF state. In some embodiments, the handheld grooming appliance 200 may include a power source such as a battery allowing cordless operation of the handheld grooming appliance 200. In other embodiments, the handheld grooming appliance 200 may be connected to an external power source during operation and/or for charging of an internal power source. In alternative embodiments, the handheld grooming appliance 200 may include any components that enable the handheld grooming appliance 200 to operate as described herein.

The housing 202 includes a handle 210 and a head 212. The head 212 is releasably attached to the handle 210 by a magnetic coupling system 214. In other embodiments, at least a portion of the head 212 may be permanently affixed to the handle 210. The handle is configured to be grasped by a user and allow positioning of the grooming appliance 200 to perform a grooming operation when the grooming appliance is in an ON state. The power switch 208 and/or another suitable user interface may be positioned on the handle 210. The handle 210 is elongate and extends along a longitudinal axis 216 from a first end 218 to a second end 220. The head 212 extends from the second end 220 of the handle 210 along the longitudinal axis 216. In other embodiments, the grooming appliance 200 may include any housing 202 that enables the grooming appliance to operate as described herein.

The grooming device 204 is supported by the housing 202 and is arranged to extend at least partially from the head 212. In the illustrated embodiment, the grooming device 204 includes an epilator assembly 222 and is configured as a hair removing device. Specifically, in the illustrated embodiment, the grooming device 204 includes at least one movable member 224 configured to pluck hairs during operation of the grooming device 204. In other embodiments, the grooming appliance 200 may include any suitable grooming device 204 including, for example and without limitation, a shaver, an epilator, a hair trimming device, an intense pulsed light (IPL) device, a laser device, a skincare device, a brush, a massager, and/or any other suitable grooming device.

The magnetic coupling system 214 includes at least one magnet 226 that attaches to the handle 210. In the illustrated embodiment, the magnetic coupling system 214 includes two magnets 226 mounted to the head 212 and positioned on opposite sides of the longitudinal axis 216. The magnets 226 are arranged to attach to a portion of the handle 210 and/or to one or more magnets on the handle to retain the head 212 to the handle 210 during operation of the grooming appliance 200. In addition, the magnetic coupling system 214 is arranged to allow pulling detachment of the head 212 from the handle 210 when a user applies a pulling force to the head 212 and/or the handle 210 that is greater than the attractive force provided by the magnets 226. In other embodiments, the magnetic coupling system 214 may have other arrangements without departing from some aspects of the disclosure. For example, in some embodiments, the magnetic coupling system 214 may include one magnet 226 or three or more magnets 226. In further embodiments, at least one magnet 226 may be mounted to the handle 210.

The magnets 226 are positioned within the interior space 206 defined by the housing 202 and away from the exterior of the housing 202 to inhibit the magnets 226 from attracting or interfering with objects on the exterior of the housing 202. In addition, in some embodiments, the magnets 226 may be shielded from electronics or drive systems within the grooming appliance 200 to prevent the magnetic fields of the magnets 226 from interfering with other components of the grooming appliance.

During use, a user may grasp the handle 210 and position the grooming device 204 proximate an area to be groomed. The user may switch the grooming appliance 200 to the ON state and perform a grooming operation. After the grooming operation, the user may remove the head 212 and the grooming device 204 from the handle 210 by applying a force to the head 212 that is greater than the attractive force provided by the magnets 226. The user may replace the head 212 with a different head including an alternative grooming device. The second head may have the same arrangement of magnets 226 as the first head 212 to form the magnetic coupling system 214. To attach the head 212 (either the same head 212 or a new head 212) to the handle 210, a user positions the head 212 such that the magnets 226 attract a corresponding portion of the handle. As the magnets 226 approach the handle 210, the attractive forces increase and the head 212 and the handle 210 are pulled together. The magnets 226 are arranged such that the grooming device 204 automatically aligns on the handle 210 into an operative position.

Figure 17:
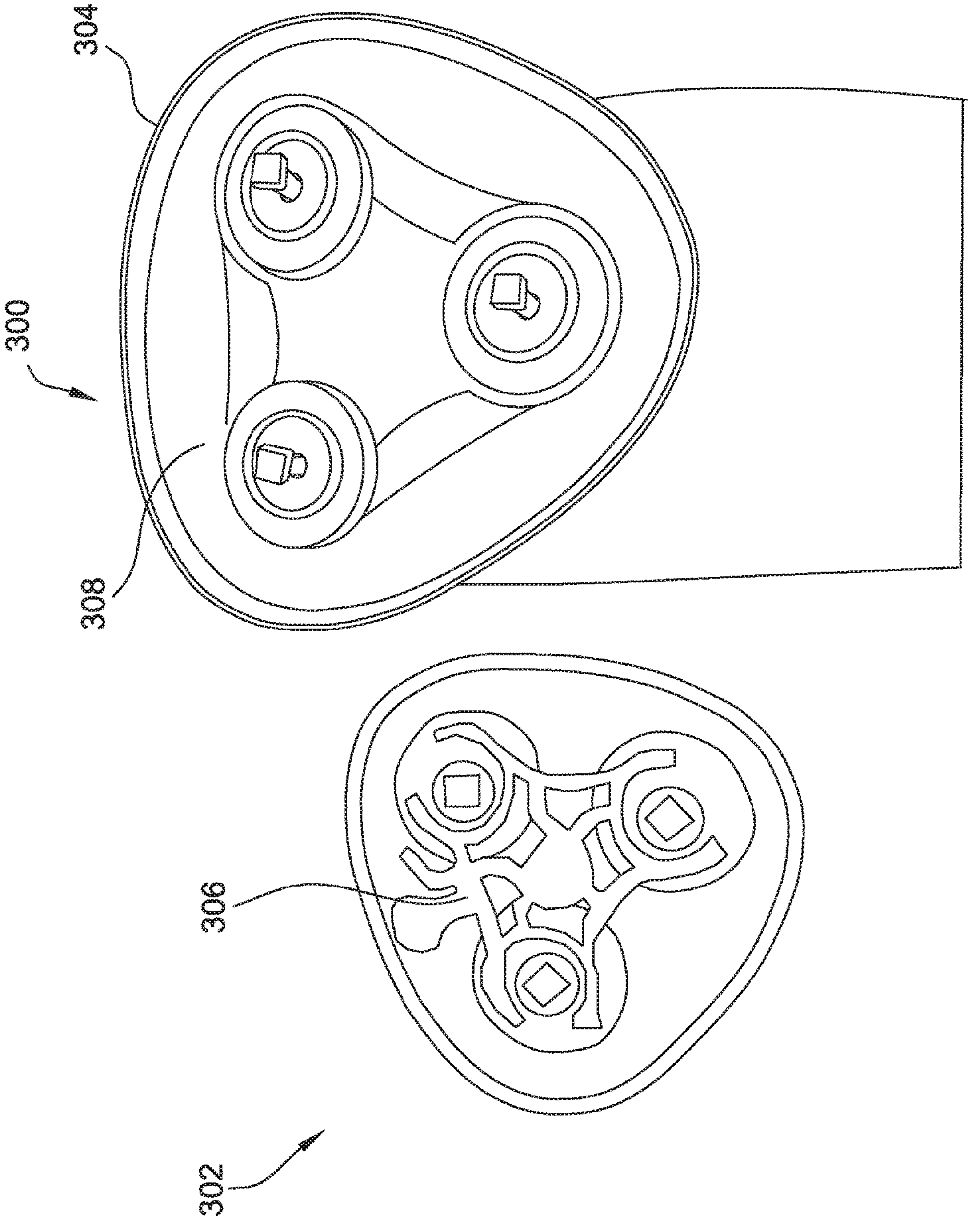
FIG. 17 is a perspective view of another suitable electric handheld grooming appliance, with a grooming device detached from a housing.

FIG. 17 is a perspective view of another suitable electric handheld grooming appliance 300, with a grooming device 302 detached from a housing 304. The grooming appliance 300 is similar to the grooming appliances described herein. In particular, the grooming device 302 is removably attached to the housing 304 by a magnetic coupling system 306. The magnetic coupling system 306 includes a plurality of paired magnetics that are enclosed in the housing 304 and the grooming device 302. The magnets enclosed in the housing 304 are configured to align with and attract the magnets enclosed in the grooming device 302 to secure the grooming device 302 in position when the grooming device 302 is attached to the housing 304.

The housing 304 includes an end wall 308 that separates the grooming device 302 from the interior space defined by the housing 304 when the grooming device 302 is attached to the housing 304. The end wall 308 substantially seals the interior space to prevent fluid and hair ingress into the interior space. The magnets are positioned in the interior space on a side of the wall opposite from the grooming device 302. For example, the magnets may be countersunk below the end wall 308 with only the end wall 308 extending over the magnets. The end wall 308 provides a substantially smooth and even surface free of any projections or indentations around the magnets. Accordingly, the housing 304 is easier to clean because hair is not trapped on or around the magnets.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description and shown in the accompanying drawings shall be interpreted as illustrative and not in a limiting sense.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A handheld grooming appliance comprising:

a housing defining a handle, a head, and an interior space;

a drive system including a motor, the motor being disposed in the interior space of the housing;

a grooming device operatively connected to the motor and supported by the head of the housing, the grooming device including:

a first blade assembly including a first moveable blade and a first stationary blade;

a second blade assembly including a second moveable blade and a second stationary blade; and a third blade assembly including a third moveable blade and a third stationary blade;

a magnetic coupling system configured to releasably attach the grooming device to the head of the housing, the magnetic coupling system including a plurality of first magnets located on the grooming device and a plurality of second magnets located on the head of the housing, the plurality of first magnets and the plurality of second magnets providing an attractive force for securing the grooming device to the housing during operation of the handheld grooming appliance, wherein the attractive force between the plurality of first magnets and the plurality of second magnets is in a range of 5 Newton to 35 Newton, and the magnetic coupling system being arranged to allow selective detachment of the grooming device from the housing when a user applies a force greater than the attractive force between the plurality of first magnets and the plurality of second magnets;

wherein the plurality of first magnets and the plurality of second magnets are arranged to allow the grooming device to be attached to the head of the housing in a plurality of orientations with the first blade assembly, the second blade assembly, and the third blade assembly in operative connection with the motor, the magnetic coupling system remaining stationary relative to the housing during operation of the drive system; and a Y-shaped frame located on the grooming device, the Y-shaped frame having three distal ends, and each magnet of the plurality of first magnets being disposed on respective one of the distal ends of the Y-shaped frame.

2. The handheld grooming appliance of claim 1, wherein the attractive force between the plurality of first magnets and the plurality of second magnets is in a range of 5 Newton to 10 Newton.

3. The handheld grooming appliance of claim 1, wherein the plurality of first magnets and the plurality of second magnets are arranged juxtaposed the first blade assembly, the second blade assembly, and the third blade assembly for automatically aligning the first blade assembly, the second blade assembly, and the third blade assembly in operative connection with the motor when the grooming device is attached to the head of the housing in each of the plurality of orientations, each first magnet of the plurality of first magnets being disposed on respective distal ends of the Y-shaped frame.

4. The handheld grooming appliance of claim 1 further comprising alignment features disposed on the housing and configured to guide the grooming device into operative alignment with the drive system when the plurality of first magnets is attached to the plurality of second magnets.

5. The handheld grooming appliance of claim 1, wherein the head of the housing includes a plurality of recesses, and wherein each magnet of the plurality of second magnets is mounted within the one of the recesses, each of the recesses being sized to receive a portion of one of the first magnets when the grooming device is attached to the handle.

6. The handheld grooming appliance of claim 1 further comprising an upper magnet support for supporting each magnet of the plurality of first magnets, and a lower magnet support for supporting each magnet of the plurality of second magnets, the upper magnet support and the lower magnet support being configured to maintain a distance between each magnet of the plurality of first magnets and each magnet of the plurality of second magnets when the grooming device is attached to the head of the housing.

7. The handheld grooming appliance of claim 6 wherein the lower magnet support comprises a plastic material, the plastic material being disposed between each magnet of the plurality of first magnets and each magnet of the plurality of second magnets when the grooming device is attached to the head of the housing.

8. The handheld grooming appliance of claim 6 wherein the lower magnet support comprises a wall that forms a portion of a hair pocket and prevents hair from contacting the at least one second magnet.

9. The handheld grooming appliance of claim 8 wherein drive system comprises three drive shafts, each of the drive shafts being adapted to receive the first blade assembly, the second blade assembly, and the third blade assembly such that the grooming device can be attached to the housing in three different orientations.

10. The handheld grooming appliance of claim 1 wherein the plurality of first magnets and the plurality of second magnets are not in direct contact with each other when the grooming device is attached to the head of the housing.

11. The handheld grooming appliance of claim 10 wherein each magnet of the plurality of first magnets and each magnet of the plurality of second magnets are separated by plastic when the grooming device is attached to the head of the housing.

12. A grooming device for a handheld electric hair grooming appliance, the grooming device comprising:

a Y-shaped frame have three distal ends;

a blade assembly including a moveable blade and a stationary blade;

a magnetic coupling system configured to releasably attach the grooming device to a housing of the handheld electric hair grooming appliance, the magnetic coupling system including one of a plurality of first magnets located on respective one of the three distal ends of the Y-shaped frame, the magnetic coupling system being arranged to allow selective detachment of the grooming device from the housing when a user applies a force greater than the attractive force of the magnetic coupling system; and wherein the plurality of first magnets is mounted proximate the blade assembly and arranged to allow the grooming device to be coupled to the housing in a plurality of orientations, the magnetic coupling system not requiring an actuator to remove the grooming device from the housing, and the magnetic coupling system remaining stationary relative to the housing during operation of a drive system of the handheld electric hair grooming appliance, wherein the magnetic coupling system is spaced from the drive system.

13. The grooming device of claim 12, wherein the attractive force provided by the plurality of first magnets and the plurality of second magnets is in a range of 5 Newton to 35 Newton.

14. The grooming device of claim 13, wherein the attractive force provided by the plurality of first magnets and the plurality of second magnets is in a range of 5 Newton to 10 Newton.

15. The grooming device of claim 12, wherein each first magnet of the plurality of first magnets extends at least partially into a recess of the housing when the grooming device is secured to the grooming appliance.

* * * * *